(12) United States Patent
Rose, Jr. et al.

(10) Patent No.: US 10,440,504 B2
(45) Date of Patent: Oct. 8, 2019

(54) REMOTE WIND TURBINE INSPECTION USING IMAGE RECOGNITION WITH MOBILE TECHNOLOGY

(71) Applicant: General Electric Company, Schenectady, NY (US)

(72) Inventors: Raymond Francis Rose, Jr., Niskayuna, NY (US); Neils Chris Schmitt, Clifton Park, NY (US); Quinn Schneller, Stillwater, NY (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 14/855,595

(22) Filed: Sep. 16, 2015

(65) Prior Publication Data

US 2017/0078841 A1  Mar. 16, 2017

(51) Int. Cl.
| | |
|---|---|
| *F03D 7/00* | (2006.01) |
| *H04W 4/021* | (2018.01) |
| *F03D 17/00* | (2016.01) |
| *F03D 80/50* | (2016.01) |

(52) U.S. Cl.
CPC ............ *H04W 4/021* (2013.01); *F03D 17/00* (2016.05); *F03D 80/50* (2016.05); *F05B 2240/96* (2013.01); *Y02E 10/72* (2013.01)

(58) Field of Classification Search
CPC ........ H04W 4/021; F03D 17/00; F03D 80/50; F05B 2240/96; Y02E 10/72
See application file for complete search history.

(56) References Cited

U.S. PATENT DOCUMENTS

| | | | |
|---|---|---|---|
| 2010/0274400 A1* | 10/2010 | Ormel | F03D 7/043 700/287 |
| 2011/0091321 A1* | 4/2011 | Baker | F03D 7/047 416/1 |
| 2012/0164989 A1* | 6/2012 | Xiao | G07C 5/008 455/414.1 |
| 2014/0155022 A1* | 6/2014 | Kandregula | G06Q 50/01 455/405 |
| 2015/0287318 A1* | 10/2015 | Nair | G08C 17/02 340/5.52 |

* cited by examiner

*Primary Examiner* — Pakee Fang
(74) *Attorney, Agent, or Firm* — Dority & Manning, P.A.

(57) ABSTRACT

Systems and methods of inspecting a wind turbine system are provided. In particular, a user device located proximate a wind turbine can obtain location data and component data associated with one or more components of the wind turbine. The component data can be associated with the location data. Maintenance data can then be determined based at least in part on the location data and the component data. The maintenance data can be associated with one or more repair procedures for the one or more components. The maintenance data can then be provided for display by the user device.

12 Claims, 5 Drawing Sheets

REMOTE WIND TURBINE INSPECTION USING IMAGE RECOGNITION WITH MOBILE TECHNOLOGY

FIELD OF THE INVENTION

The present subject matter relates generally to wind turbines, and more particularly to systems and methods for performing inspections on wind turbine components.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The maintenance of wind turbine components is critical to the ongoing operation of a wind turbine. Thus, maintenance operations, such as inspections, are routinely performed on wind turbine components to ensure that they are in optimal operating condition. For example, visual inspections of the exterior of a rotor blade may be performed to identify cracks and other potential defects. Such inspections may be performed by on site technicians. For instance, an inspecting technician may record information associated with the inspection. The technician may then log the data into a configuration management system on an off-site computing device when the technician leaves the wind turbine site.

Such recordation techniques can cause inaccuracies in the recorded information. Further, such techniques can be time consuming and inefficient. Accordingly, there is a need for an efficient, accurate, timely, and effective system for performing an inspection on wind turbine components.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of providing diagnostic information associated with a wind turbine farm. The method includes receiving, by one or more computing devices, location information indicative of a geographic location of a wind turbine within a wind turbine farm. The method further includes obtaining, by the one or more computing devices, first data associated with one or more components of the wind turbine. The method further includes providing, by the one or more computing devices, the location information and the first data to a remote computing device. The method further includes receiving, by the one or more computing devices, second data associated with the one or more components. At least a portion of the second data comprises maintenance information associated with the one or more components. The maintenance information is determined based at least in part on the location information and the first data.

Another example aspect of the present disclosure is directed to a computing system including one or more processors and one or more memory devices. The one or more memory devices store computer-readable instructions that when executed by the one or more processors cause the one or more processors to perform operations. The operations include receiving location information associated with a wind turbine in a wind turbine farm. The location information specifies a geographical location of the wind turbine. The operations further include receiving first data associated with one or more components of the wind turbine. The operations further include determining second data associated with the one or more components of the wind turbine based at least in part on the location information and the first data. The second data comprises information relating to one or more repair procedures associated with the one or more components. The operations further include providing the second data to one or more remote computing devices.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
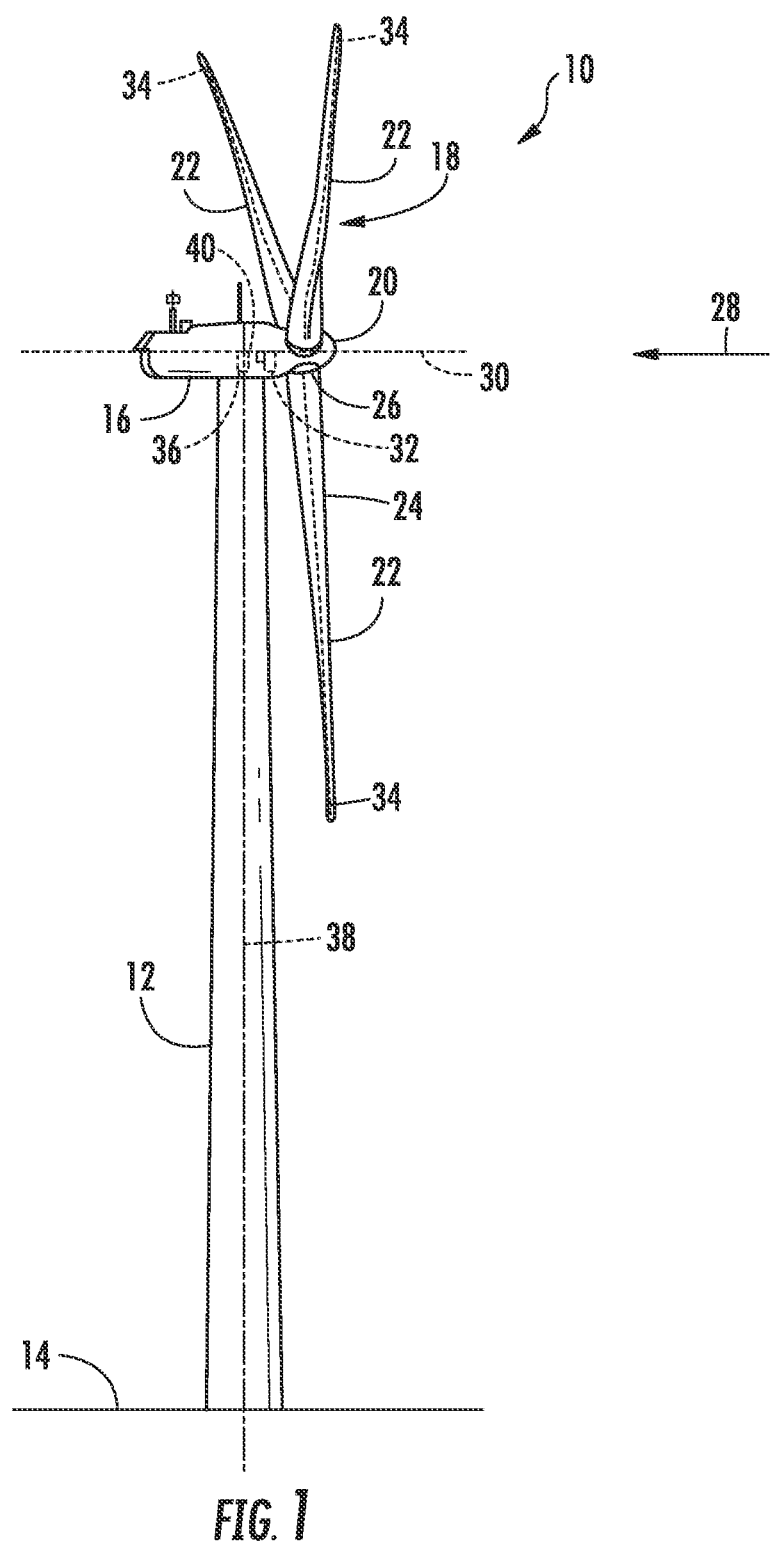
FIG. 1 depicts an example wind turbine system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example embodiments of the present disclosure are directed to determining location, configuration, diagnostic and/or maintenance information associated with a wind turbine in a wind turbine farm. For instance, a user device can obtain data associated with one or more components of a wind turbine. The component data can be obtained from an image depicting the one or more components, or from other sources. The user device can further obtain location information specifying a current location of the user device and/or the wind turbine. For instance, the location information can specify a geographic location (e.g. latitude, longitude coordinates). In example embodiments, the geographic location can further include altitude information (e.g. elevation information). The wind turbine and/or the one or more components can then be associated with the location information, for instance, in one or more databases at a remote computing device (e.g. server). Maintenance data associated with the one or more components can then be determined based at least in part on the component data. The maintenance data can then be provided to the user device, such that a technician may use the maintenance data to service the wind turbine.

More particularly, a user device can obtain component data indicative at least in part of an identification of a wind turbine and/or one or more components of the wind turbine. A user device can be a smartphone, tablet, laptop, wearable computing device, or any other suitable computing device capable of being carried by a user while in operation. The component data can include a model name, model number, serial number, or other identifier associated with the one or more components. In example embodiments, the component data can be obtained using an image capture device associated with the user device to capture one or more images of the wind turbine and/or the one or more components. In alternative embodiments, the component data can be obtained from a separate and distinct device, such as a drone or another user device, or using fiber optics. In this manner, the separate and distinct device can, for instance, capture one or more images, and provide the one or more images to the user device. For instance, the one or more images can depict at least a portion of a component of the wind turbine. As another example, the one or more images can depict the component serial number displayed, for instance, on a nameplate or other marker located on or near the component. In such embodiments, at least a portion of the data can be determined from the one or more images using text recognition techniques. In embodiments wherein an image depicts at least a portion of the component, image recognition techniques can be used to identify a component make, model and/or other identifying information from the image depicting at least a portion of the component, for instance, without the need to obtain an image of the nameplate or other marker.

In an alternative embodiment, the component data can be stored in a machine-readable optical code, such as a matrix code or a two-dimensional code (e.g. Quick Response (QR) Code). The machine-readable code can be located on or near the one or more components. In alternative embodiments, the machine-readable code can be displayed by a display device associated with the component. In this manner, one or more images can be captured depicting the machine-readable code. The component data can then be identified or interpreted from the machine readable image by the user device. In another alternative embodiment, the component data can be identified using radio-frequency identification (RFID) techniques. For instance, the identification data can be stored in an RFID tag, and identified by an RFID reader associated with the user device while the user device is proximate the RFID tag. It will be appreciated that the component data can be determined or otherwise identified using various other suitable techniques.

In example embodiments, the component data can further include temporal data and/or other data input by a user. The temporal data can specify a date and time associated with the component data, and/or a duration of activities performed by a wind turbine technician. The component data can further include an identification of the technician, and/or notes or other images input by the technician.

The user device can further receive location information specifying a geographic location of the user device. The location information can be determined using GPS, IP address, cell triangulation, proximity to Wi-Fi access points, proximity to beacon devices, or other suitable location determination techniques. The wind turbine and/or the one or more components can then be associated with the location information. In this manner, each wind turbine in the wind turbine farm can be associated with a unique location, for instance, in one or more databases at a server. Each component of the wind turbine can then also be associated with the wind turbine and/or the unique location.

Maintenance data associated with the one or more components can then be determined based at least in part on the component data. For instance, the maintenance data can include data relating to maintenance requirements, one or more repair procedures associated with the one or more components, a status condition report associated with the one or more components, a maintenance cycle associated with the one or more components, replacement components, and/or an inventory level associated with the replacement components. The maintenance data can be determined using the component data. For instance, the maintenance data can be determined based at least in part on the identification of the one or more components. In further embodiments, the maintenance data can be determined using pattern recognition and/or machine learning techniques on the one or more images of the component(s). Such techniques can be used, for instance, to determine an amount of wear and/or degradation associated with the component(s). The determined wear and/or degradation can then be used, for instance, to determine an amount of time until a replacement component is required. As another example, the pattern recognition techniques can be used to determine one or more repair procedures that can be implemented by a technician associated with the wind turbine. It will be appreciated that the pattern recognition techniques can be used to determine various other suitable information.

With reference now to the Figures, example embodiments of the present disclosure will now be discussed in detail. For instance, FIG. 1 depicts a perspective view of an example wind turbine 10. In the example embodiment, wind turbine 10 is a horizontal-axis wind turbine. Alternatively, wind turbine 10 may be a vertical-axis wind turbine. In the example embodiment, wind turbine 10 includes a tower 12 that extends from a support surface 14, such as the ground or a platform or foundation, a nacelle 16 mounted on tower 12, and a rotor 18 that is coupled to nacelle 16. Rotor 18 includes a rotatable hub 20 and at least one rotor blade 22 coupled to and extending outward from hub 20. In the example embodiment, rotor 18 has three rotor blades 22. In an alternative embodiment, rotor 18 includes more or less than three rotor blades 22. In the example embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the example embodiment, a blade pitch of each rotor blade 22 is controlled individually by a control system 36. Alternatively, the blade pitch for all rotor blades 22 may be controlled simultaneously by control system 36. Further, in the example embodiment, as direction 28 changes, a yaw direction of nacelle 16 may be controlled about a yaw axis 38 to position rotor blades 22 with respect to direction 28.

In the example embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
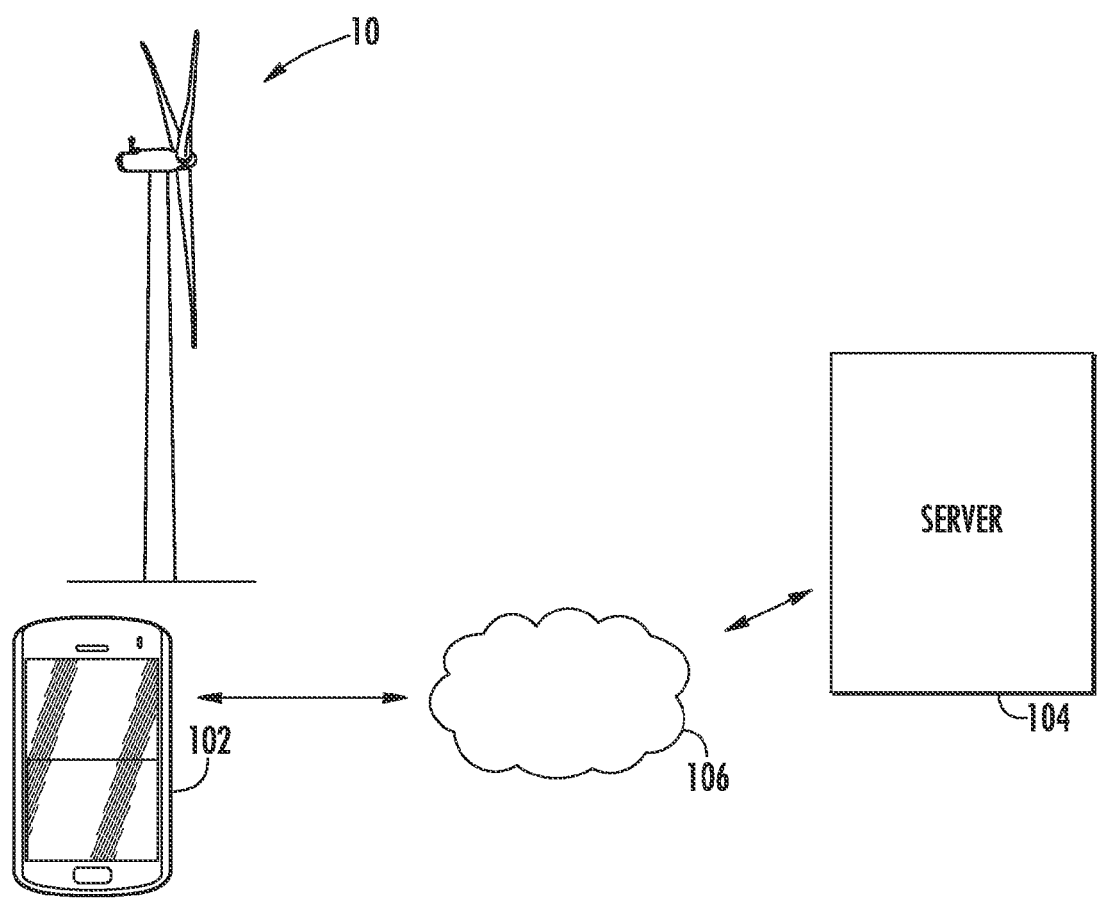
FIG. 2 depicts an overview of an example system for providing wind turbine data according to example embodiments of the present disclosure.

FIG. 2 provides an overview of an example system for providing maintenance information to a user according to example embodiments of the present disclosure. FIG. 2 depicts wind turbine 10, and a user device 102. User device 102 can be a smartphone, tablet, laptop computer, mobile phone, wearable computing device, or any other suitable computing device capable of being carried by a user while in operation. User device 102 can include an image capture device (e.g. digital camera) 104. Image capture device 104 can be configured to capture one or more images of wind turbine 10, for instance, responsive to an input from a user. In particular, the one or more images can depict at least a portion of a component of wind turbine 10. For instance, the one or more images may depict a nameplate located on or near the component specifying a serial number, model number, model name, or other suitable identifier associated with the component.

As another example, the one or more images can depict a machine-readable code (e.g. QR code) located on or near the component. The machine-readable code may contain information indicative of a serial number, model number, model name, or other suitable identifier associated with the component. The identifier can then be identified or determined from the one or more images, for instance, using text recognition techniques and/or image interpretation techniques. The identifier and/or the captured image(s) can then be provided to a server 104 over a network 106. The exact identity of the wind turbine component can then be determined based at least in part on the identifier.

Figure 3:
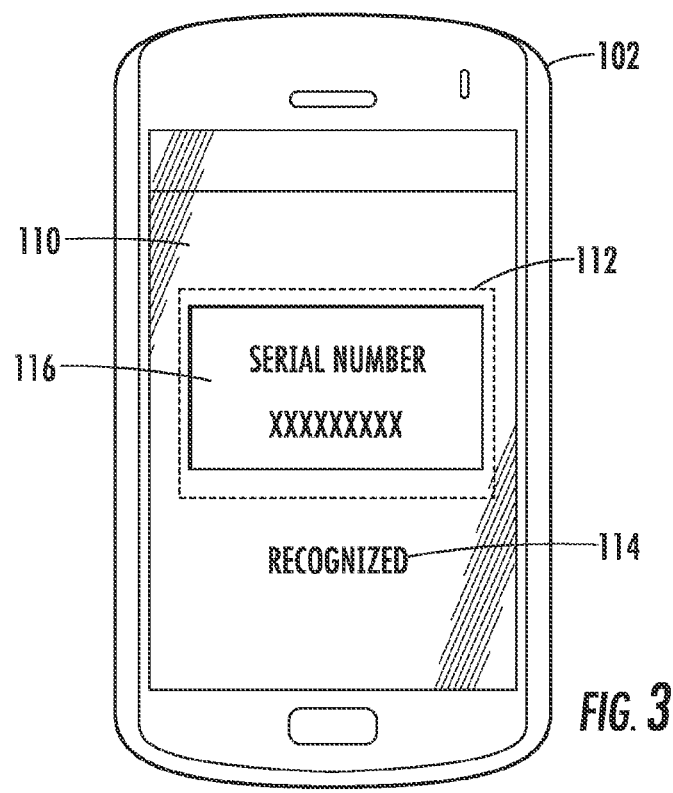
FIG. 3 depicts an example user interface for wind turbine inspection according to example embodiments of the present disclosure.
Figure 4:
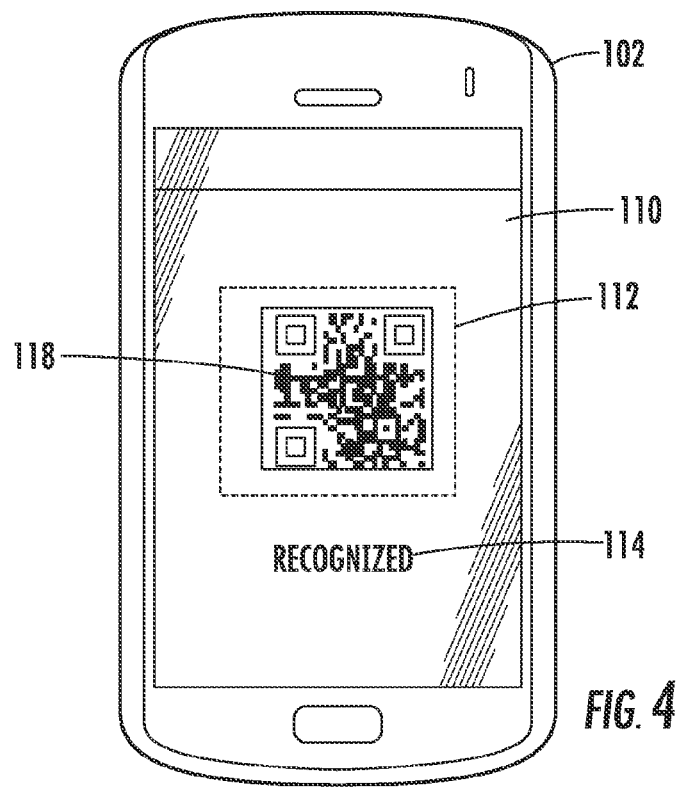
FIG. 4 depicts an example user interface for wind turbine inspection according to example embodiments of the present disclosure.

User device 102 can provide for display a user interface facilitating the capturing and/or annotating of the one or more images. For instance, FIGS. 3 and 4 depict an example user interface 110 according to example embodiments of the present disclosure. User interface 110 can include an image recognition boundary 112. When initiating image capture, a user of user device 102 can position user device 102 relative to the wind turbine component, such that the object of the image (e.g. the at least a portion of the wind turbine component) is positioned within image recognition boundary 112 as depicted in user interface 110. User interface 110 can further include a recognition status indicator 114. Recognition status indicator 114 can indicate to the user when the image is recognized by user device 102. User device 102 can be configured to recognize images depicting text (e.g. serial number, model number, model name) and/or machine-readable codes. For instance, FIG. 3 depicts user interface 110 when capturing an image 116 depicting a serial number located on the wind turbine component. FIG. 4 depicts user interface 110 while capturing an image 118 depicting a QR code containing identification information associated with the wind turbine component.

Referring back to FIG. 2, user device 102 can further include a positioning system configured to determine a geographic location of user device 102. The positioning system can determine the geographic location using GPS, IP address, cell triangulation, proximity to Wi-Fi access points, proximity to beacon devices, or other suitable location determination techniques. In example embodiments, the geographic location can include raw location data, such as latitude, longitude coordinates. When user device 102 is located proximate wind turbine 10, the geographic location of user device 102 can approximately correspond to the geographic location of wind turbine 10. In this manner, the determined geographic location can be provided to server 104 along with the identifier data associated with the wind turbine component. The geographic location can then be associated with the component and/or wind turbine 10. For instance, in embodiments wherein wind turbine 10 is a part of a wind turbine farm having a plurality of wind turbines, the wind turbine farm can be given a unique identifier, and wind turbine 10 can be given a unique identifier within the wind turbine farm, and the unique identifier of wind turbine 10 can be associated with the geographic location.

As will be described in greater detail below, server 104 can be configured to determine or identify maintenance data or other data associated with wind turbine 10 based at least in part on the received geographic location and/or the identifier data. For instance, server 104 can be configured to determine information relating to repair procedures, replacement components, lifespan reports, status reports, inventory levels, or other information associated with the wind turbine component. In particular, server 104 can be configured to monitor an operational cycle of the component and to determine a percentage of use relative to the total length of the operational cycle. Server 104 can further determine when a replacement component is required. As another example, in embodiments, wherein the one or more images provided to server 104 depict at least a portion of the component, server 104 can implement one or more pattern recognition techniques, for instance, to determine an amount of wear or degradation of the component. In this manner, one or more repair procedures can further be determined.

In example embodiments, at least a portion of the maintenance data can be determined from a lookup table. In particular, the lookup table can contain information associated with a plurality of components for a plurality of wind turbines in a wind turbine farm. Each component and/or wind turbine can be associated with a geographic location. The maintenance data can be determined through reference to the lookup table based at least in part on the location information received by the server device.

In alternative embodiments, the maintenance data can be determined based at least in part on component data and/or maintenance data from other wind turbines and/or other wind farms. For instance, component data for a particular component in a first wind turbine in a first wind farm can be cross-referenced with component data and/or maintenance data associated with a corresponding component in a second wind turbine in a second wind farm to determine comparison data associated with the component in the first wind turbine. In this manner, such comparison data can be used to identify maintenance data for the component in the first wind turbine. For instance, the comparison data can indicate repair procedures previously performed on the second wind turbine component, and/or that the first wind turbine component may need similar procedures performed. As another example, the comparison data may indicate a life span of the second wind turbine component, which may be compared to the current age of the first wind turbine component. In particular, the comparison data can take into account factors such as the wind farms in which the wind turbines are located, the countries in which the wind farms are located, the grid codes and/or regulations for the countries in which the wind farms are located and/or other factors.

The maintenance data can be associated with the wind turbine component and/or wind turbine 10, and stored by server 104. The maintenance data can further be provided to user device 102. In this manner, a technician servicing wind turbine 10 can receive the maintenance data via user device 102. Additional data can be provided to user device 102, such as a service history, previous images and/or notes recorded by a technician, or other data.

The client-server architecture depicted in FIG. 2 is intended for illustrative purposes only. It will be appreciated that, in alternative embodiments, some or all of the actions performed by server 104 can be performed by user device 102. For instance, in some embodiments, the maintenance data can be identified or determined by user device 102 without the need for communication with server 104.

Figure 5:
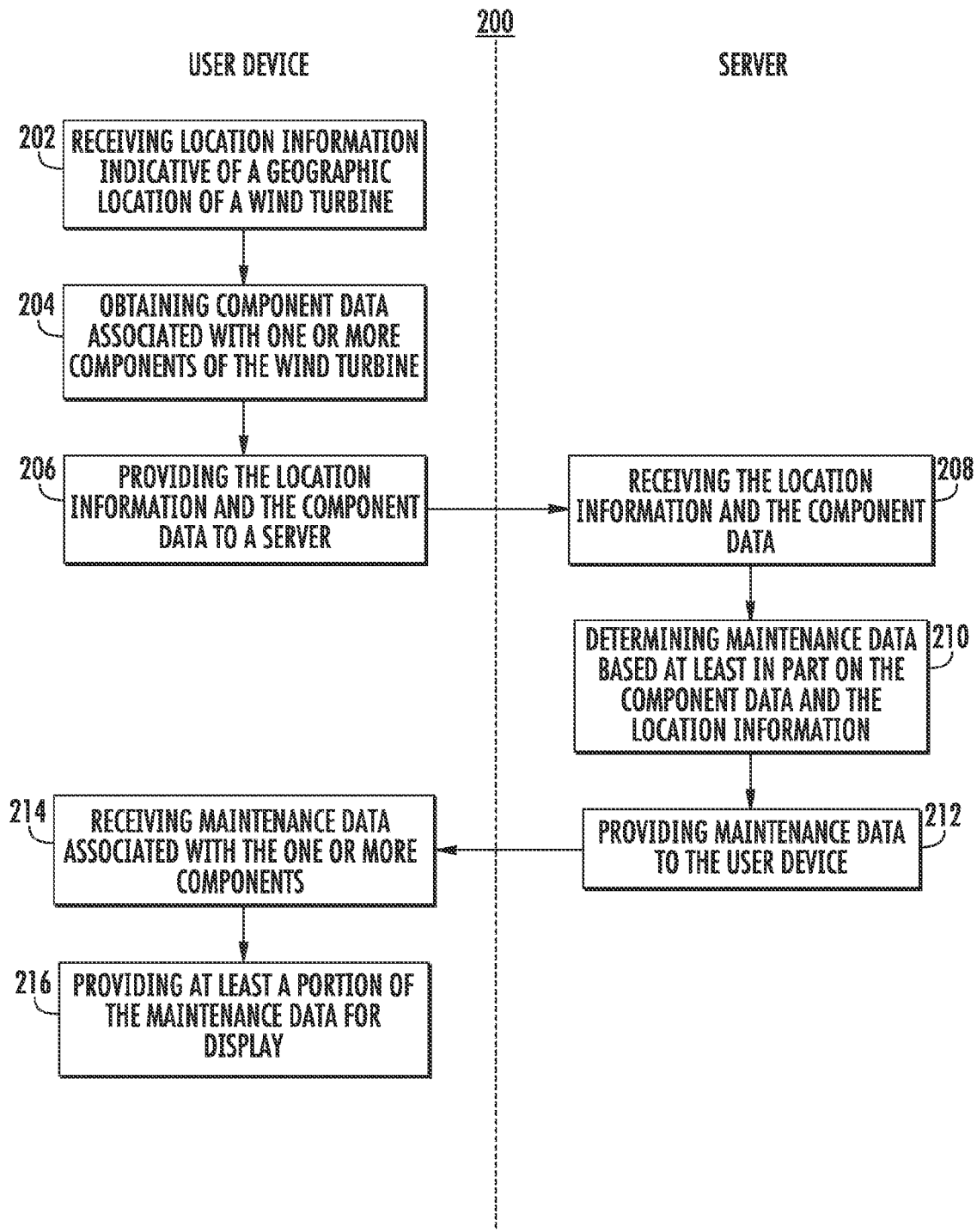
FIG. 5 depicts a flow diagram of an example method of providing maintenance data to a user according to example embodiment of the present disclosure.

FIG. 5 depicts a flow diagram of an example method (200) of providing maintenance data associated with a wind turbine to a user. Method (200) can be implemented by one or more computing devices, such as one or more of the computing devices depicted in FIGS. 2 and 6. In addition, FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (202), method (200) can include receiving, by a user device, location information indicative of a geographic location of a wind turbine. For instance, the wind turbine can be included in a wind turbine farm having a plurality of wind turbines. The location information can include raw location information, such as latitude, longitude coordinates. In example embodiments, the location information may further include information indicative of an altitude of the user device. For instance, the altitude may be determined using GPS or other techniques. The altitude may be further determined using one or more sensors associated with the user device, such as a barometer.

At (204), method (200) can include obtaining, by the user device, component data associated with one or more components of the wind turbine. The component data can be obtained from one or more captured images depicting at least a portion of the component. The one or more captured images can further depict a nameplate located on the component. The nameplate can specify identification data associated with the component, such as a model number, model name, serial number, etc. The one or more images can further still depict a machine-readable optical code located on or near the component. The machine-readable optical code can contain identification data associated with the component or other data. In alternative embodiments, the component data can be obtained using radio-frequency identification (RFID) techniques. For instance, an RFID tag can be located on or near the wind turbine component. An RFID reader associated, for instance, with a user device can be used to obtain the component data from the RFID tag.

The component data can further include additional data. For instance, the component data can include notes and/or additional images input by a user of the user device. As another example, the component data may include temporal data, such as a timestamp indicative of a time and/or duration of activities performed at the wind turbine. The component data may further include an identification of a technician servicing the wind turbine. It will be appreciated that the component data can also include various other suitable information.

At (206), method (200) can include providing, by the user device, the location information and the component data to a remote computing device. For instance, the location information and the component data can be provided to one or more server devices. At (208), method (200) can include receiving, by the server, the location information and the component data. The server may then be configured to associate the location information with the component data, and to store the associated data for future use. In this manner, a subsequent technician servicing the wind turbine can request information associated with one or more components of the wind turbine, and at least a portion of the component data can be provided to the technician. The component data can be identified based at least in part on the location information associated with the technician.

At (210), method (200) can include determining, by the server, maintenance data associated with the one or more components based at least in part on the component data and the location information. In particular, upon receiving the location information and the component data, the server device can determine maintenance data based at least in part on the location information and/or the component data. For instance, as indicated above, the maintenance data can include data relating to one or more repair procedures associated with the one or more components, a status report associated with the one or more components, a maintenance cycle associated with the one or more components, replacement components, an inventory level associated with the replacement components, and/or other information. In example embodiments, the maintenance data can be determined using pattern recognition techniques on one or more images depicting the component. The maintenance data can further be determined by reference to a lookup table including information associated with the wind turbine.

At (212), method (200) can include providing, by the server, the maintenance data to the user device. At (214), method (200) can include receiving, by the user device, the maintenance data associated with the one or more components. At (216), method (200) can include providing for display, by the user device, at least a portion of the maintenance data in a user interface. In particular, the user device may display the at least a portion of maintenance data by a display device associated with the user device. A user of the user device, such as a wind turbine technician, may then perform one or more actions in accordance with the maintenance data.

Figure 6:
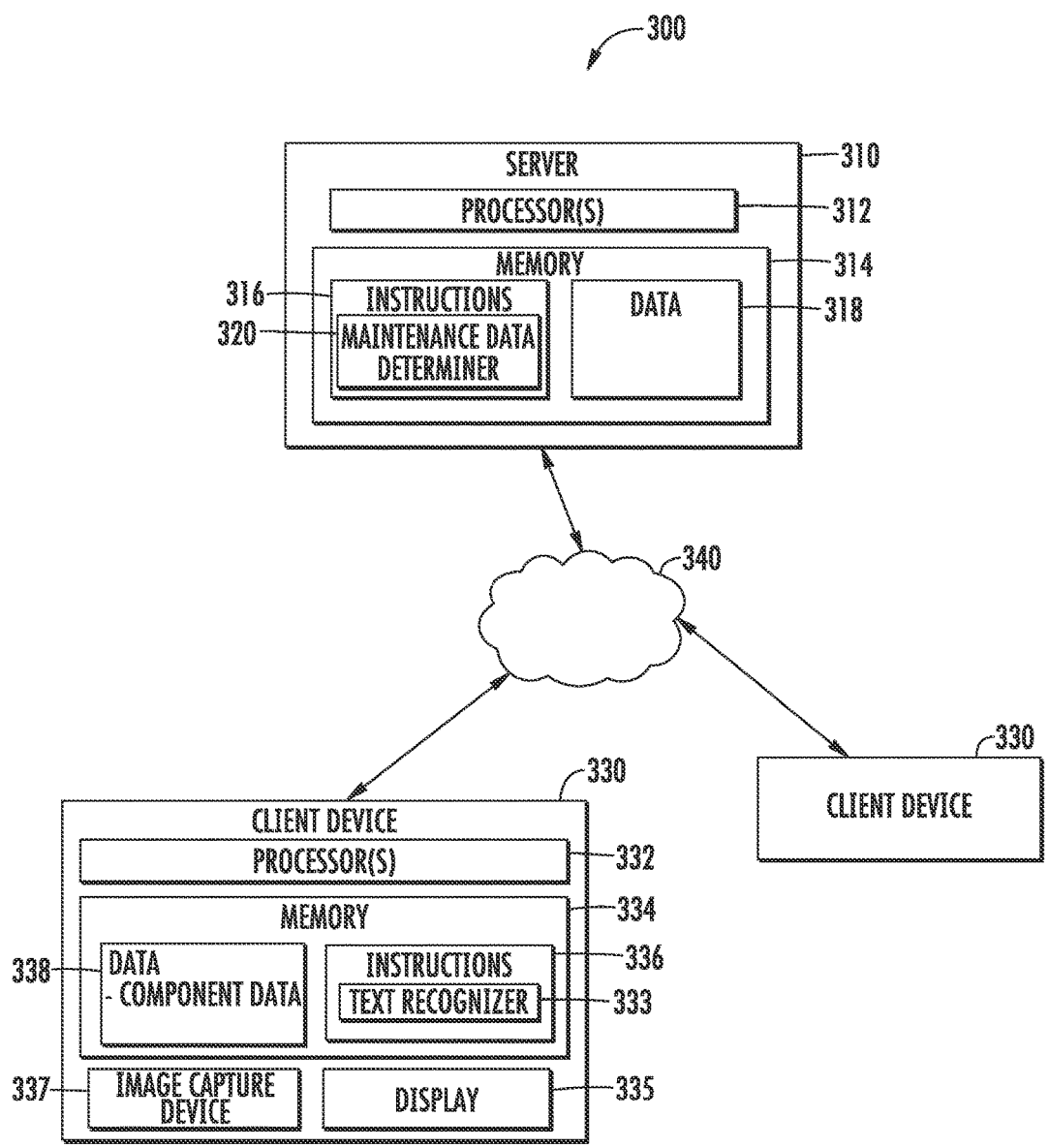
FIG. 6 depicts an example system according to example embodiments of the present disclosure.

FIG. 6 depicts a schematic view of an example system for providing maintenance data to a user according to example embodiments of the present disclosure. As shown, the system 300 can be implemented, for instance, using a client-server architecture including a server 310 that communicates with one or more client devices 330 over a network 340. It should be appreciated that, as used herein, the term "server" may correspond to physical computing devices or virtual machines hosted on physical computing devices. In alternative embodiments, the system 300 can be implemented using various other suitable architectures, such as a single computing device.

The system 300 includes a server 310, such as for instance, a web server. The server 310 can host a wind turbine farm management system. The server 310 can be implemented using one or more suitable computing devices. The server 310 can include and/or be associated with one or more processors 312 and one or more memory devices 314. The server 310 can also include a network interface to facilitate communication with one or more client devices 330 over the network 340. The network interface can include various suitable components for interfacing with one more networks, including for example, transmitters, receivers, ports, controllers, antennas, and/or other suitable components.

The one or more processors 312 can include a microprocessor, microcontroller, integrated circuit, logic device, or other suitable processing device. Additionally, the one or more memory devices 314 can include one or more computer-readable media, such as for instance, non-transitory computer-readable media, RAM, ROM, hard drives, flash drives, floppy disks, compact disc-read only memory (CD-ROM), magneto-optical disk (MOD), digital versatile disc (DVD) and/or other suitable memory devices. The memory device(s) 314 can generally be configured to store information accessible by the processor(s) 312, including computer-readable instructions 316 that can be executed by the processor(s) 312. The instructions 316 can be any suitable set of instructions that when executed by the processor(s) 312, cause the processor(s) 312 to perform operations. For instance, the instructions 316 can be executed by the processor(s) 312 to implement a maintenance data determiner 320. Maintenance data determiner 320 can be configured to receive component data from client device 330 and to determine maintenance data based at least in part on the received component data.

As shown in FIG. 6, the one or more memory devices 314 can also store data 318 that can be retrieved, created, manipulated, and/or stored by the processor(s) 312. In example embodiments, the data 318 can be stored in one or more databases. The one or more databases can be connected to the server 310 through a high bandwidth LAN or WAN, or can also be connected to server 310 through network 340. In example embodiments, the one or more databases may be separated so that they are located in multiple locations.

The server 310 can exchange data with one or more client devices 330 over the network 340. For instance, a client device can include a user device associated with a wind turbine technician. Although two client devices 330 are illustrated in FIG. 3, any suitable number of client devices 330 can be connected to the server 310 over the network 340. Each of the client devices 330 can be any suitable type of computing device, such as a general purpose computer, special purpose computer, laptop, desktop, mobile device, navigation system, smartphone, tablet, wearable computing device, a display with processor(s), or other suitable computing device. In example embodiments, each client device 330 can correspond to user device 102 of FIG. 2.

Similar to the server 310, a client device 330 can generally include one or more processors 332 and a memory 334. The one or more processors 332 can include one or more central processing units (CPUs), graphics processing units (GPUs) dedicated to rendering images or performing other specialized calculations, and/or other processing devices. The memory 334 can include one or more computer-readable media and can store information accessible by the processor(s) 332, including instructions 336 that can be executed by the processor(s) 332. For instance, the instructions 336 can be executed by the processor(s) 332 to implement a text recognizer 333. Text recognizer 333 can be configured to identify text in one or more images. The memory 334 can also store instructions 336 for implementing a user interface module for displaying information associated with one or more wind turbines determined according to example aspects of the present disclosure. The one or more memory devices 334 can also store data 338 that can be retrieved, manipulated, created, or stored by the processor(s) 332.

The client device 330 of FIG. 6 can further include one or more input/output devices for providing information to, and receiving information from a user, such as a touch screen, touch pad, data entry keys, speakers, a microphone suitable for voice recognition, and/or other suitable input/output device. For instance, the client device 330 can include a display device 335 for presenting a user interface configured to display wind turbine information according to example aspects of the present disclosure. Client device 330 can further include an image capture device 337 configured to capture one or more images.

The client device 330 may also include a network interface used to communicate with one or more remote computing devices (e.g. server 310) over the network 340. The network interface can include any suitable components for interfacing with one more networks, including for example, transmitters, receivers, ports, controllers, antennas, or other suitable components.

The network 340 can be any type of communications network, such as a local area network (e.g. intranet), wide area network (e.g. Internet), cellular network, or some combination thereof. The network 340 can also include a connection (e.g. direct connection) between a client device 330 and the server 310. In general, communication between the server 310 and a client device 330 can be implemented via network interface using any type of wired and/or wireless connection.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of providing diagnostic information associated with a wind turbine farm, the method comprising:
   receiving, by a user device, location information indicative of a geographic location of a first wind turbine within a wind turbine farm;
   obtaining, by the user device, one or more images depicting at least a portion of a component of the wind turbine, the one or more images being captured by an image capture device associated with the user device;
   identifying, by the user device, first data associated with the component of the first wind turbine based at least in part on the one or more images;
   comparing, by the user device, the first data to data associated with a component of a second wind turbine to generate a comparison data, wherein the component of the second wind turbine corresponds to the component of the first wind turbine;
   determining, by one or more processors, an amount of wear or degradation of the component of the first wind turbine based, at least in part, on a pattern recognition technique associated with the first data;
   receiving, by the user device, second data associated with the component of the first wind turbine, the second data comprising maintenance information associated with the component, the maintenance information determined based at least in part on the location information, the first data, the comparison data and the determined wear or degradation of the component of the first wind turbine; and
   providing, by the user device, at least a portion of the maintenance information for display by a display device associated with the user device,
   wherein the at least a portion of the maintenance information specifies one or more replacement components for the wind turbine, one or more repair procedures to perform on the component of the first wind turbine and specifies a lifecycle of the component of the first wind turbine based on the comparison data and the determined wear or degradation.

2. The method of claim 1, wherein the first data further comprises at least one of a model name, a model number, and a serial number associated with the component of the first wind turbine.

3. The method of claim 2, wherein the one or more images depict a nameplate associated with the component of the first wind turbine, the nameplate specifying the serial number associated with the component of the first wind turbine.

4. The method of claim 2, wherein the one or more images depict a machine-readable code associated with the component of the first wind turbine.

5. The method of claim 2, wherein the first data is identified using one or more text recognition techniques.

6. The method of claim 1, wherein the amount of wear or degradation determined using the pattern recognition technique comprises the amount of time until replacement of the component of the first wind turbine is required based on a pattern identified from the first data.

7. The method of claim 1, wherein the second data further comprises information relating to an inventory of the one or more replacement components.

8. A computing system comprising:
   one or more processors; and
   one or more memory devices, the one or more memory devices storing computer-readable instructions that when executed by the one or more processors cause the one or more processors to perform operations, the operations comprising:
      receiving location information associated with a first wind turbine in a wind turbine farm, the location information specifying a geographical location of the wind turbine;
      receiving one or more images depicting at least a portion of a component of the first wind turbine, the one or more images being captured by an image capture device associated with the one or more processors;
      identifying first data associated with the component of the first wind turbine based at least in part on the one or more images;
      comparing the first data to data associated with a component of a second wind turbine to generate a comparison data, wherein the component of the second wind turbine corresponds to the component of the first wind turbine;
      determining an amount of wear or degradation of the component of the first wind turbine based, at least in part, on a pattern recognition technique associated with the first data;
      determining second data associated with the component of the first wind turbine based at least in part on the location information, the first data, the comparison data and the determined wear or degradation of the component of the first wind turbine; and
      providing at least a portion of the second data to a user device for display on a display device associated with the user device,
      wherein the at least a portion of the second data specifies one or more replacement components for the wind turbine, one or more repair procedures to perform on the component of the first wind turbine and specifies a lifecycle of the component of the first wind turbine based on the comparison data and the determined wear or degradation.

9. The computing system of claim 8, wherein the first data further comprises at least one of a model name, a model number, and a serial number associated with the component of the first wind turbine.

10. The computing system of claim 8, wherein the second data further comprises information relating to an inventory of the one or more replacement components.

11. The computing system of claim 8, wherein the amount of wear or degradation determined using one or more pattern recognition technique comprises the amount of time until replacement of the component of the first wind turbine is required based on a pattern identified from the first data.

12. The computing system of claim 8, wherein the second data is determined based at least in part on data associated with a second wind turbine.

\* \* \* \* \*